J. A. MALONEY.
Improvement in Metallic Sieve for Grain Separators.
No. 119,626. Patented Oct. 3, 1871.
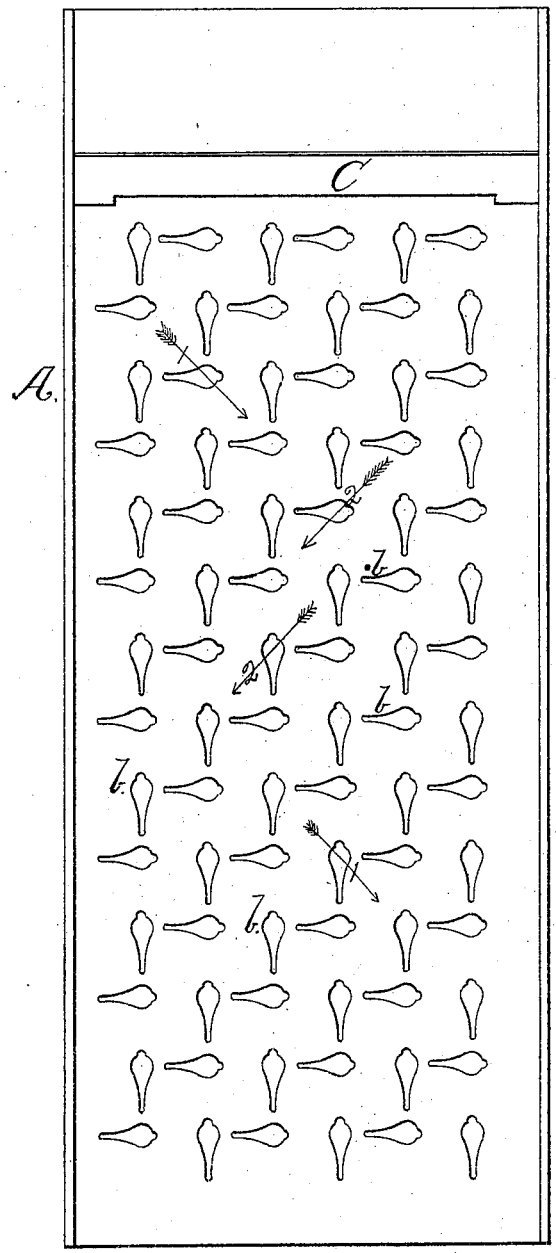
Witnesses.
Inventor.

UNITED STATES PATENT OFFICE.

JAMES A. MALONEY, OF GEORGETOWN, DISTRICT OF COLUMBIA.

IMPROVEMENT IN METALLIC SIEVES FOR GRAIN-SEPARATORS.

Specification forming part of Letters Patent No. 119,626, dated October 3, 1871.

*To all whom it may concern:*

Be it known that I, JAMES A. MALONEY, of Georgetown, in the District of Columbia, have invented a new and Improved Riddle or Screen for Grain-Separators, of which the following is a specification:

The object of my invention is to separate garlic and cockle from wheat when in an uncleaned state from the grain itself, and which I accomplish by passing the uncleaned wheat over my improved riddle or sieve, the deleterious matter falling through, while the wheat rolls or slides along the surface of the said riddle or sieve and is carried off and deposited into any desired receptacle. Great difficulty has heretofore been experienced in the separation of wheat from its usually attendant impurities, such as garlic and cockle, owing to the similarity existing as regards their diameter and specific gravity.

My invention is based upon the well-known differences existing in the configuration of the substances named, cockle being of nearly round form, and garlic of somewhat pear-shaped proportions, like the holes in the riddle hereinafter described and shown, while the wheat, being more nearly in the form of an ellipse, when thrown upon an agitated riddle of my peculiar construction the following results will be produced: The garlic will fall through the holes of the riddle or sieve being of the same shape as the garlic, or very near thereto; cockle being round and no larger than garlic, will go through the bulb part of the hole; but wheat being of an oblong shape, broad in its proportions nearly its entire length, cannot fall through or enter the holes cut for the extraction of the deleterious matter, unless, perchance, it should stand upon end, which, however, is guarded against by the fender hereinafter described.

Chaff and lighter impurities may be separated from the wheat by the blast usually employed in grain-cleaning machines, while sticks and stones larger than the wheat may be extracted by first passing the uncleaned wheat through sieves of other well-known construction.

Referring to the drawing, Figure I represents a plan view of the sieve; and Fig. II, a perspective view of the guard and sieve, showing the aperture for the sheet of grain.

A, Fig. I, represents a rectangular riddle or sieve, made of sheet metal; b, the apertures or perforations therein; and C, Figs. I and II, a guard-plate, hereinafter described. The riddle or sieve may be made of brass, tin, copper, or sheet-iron. It will be seen that the holes are arranged in regular longitudinal and transverse rows, the bulb of the hole pointing upward toward the top of the riddle, and the sharp end pointing downward toward the bottom of the riddle, while those holes running from right to left, as shown by arrows 2 in the drawing, and at right angles to the other holes just described, will have the bulbs pointing to the right side and the sharp end to the left side of the riddle. This peculiar arrangement of the holes is for the purpose of catching the garlic and cockle in whatever position they may roll on the riddle. At the top of the riddle I have arranged a fender or guard so as to spread the grain, and to prevent its piling up or banking on the riddle, by compelling it to enter thereon in a thin sheet or layer of grain only one grain thick; otherwise it is possible that the grain might turn upon end and fall through lengthwise. In practice, I contemplate using a series of guards arranged at equal distances upon the screen.

Having thus described my invention, what I claim as new, and desire to secure by Letters Patent, is—

1. A sheet-metal sieve, A, for grain-separators, provided with apertures b, formed and arranged as described and shown, for the purpose set forth.

2. In combination with a sheet-metal sieve constructed as described, the guard-plate C, substantially as and for the purpose specified.

J. A. MALONEY.

Witnesses:
JAMES H. MANDEVILLE,
ROBT. A. GRIFFIN. (111)